(12) United States Patent
Ebizawa et al.

(10) Patent No.: US 8,773,248 B2
(45) Date of Patent: Jul. 8, 2014

(54) VEHICLE CONTROL DEVICE, PORTABLE DEVICE, PORTABLE DEVICE SEARCH SYSTEM

(75) Inventors: Hideo Ebizawa, Kasugai (JP); Hideyuki Ohara, Kizugawa (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 1017 days.

(21) Appl. No.: 12/705,128

(22) Filed: Feb. 12, 2010

(65) Prior Publication Data
US 2011/0063096 A1   Mar. 17, 2011

(30) Foreign Application Priority Data

Sep. 17, 2009   (JP) .................................. 2009-215846

(51) Int. Cl.
*B60Q 1/00*   (2006.01)

(52) U.S. Cl.
USPC .............. 340/425.5; 340/426.13; 340/426.36; 340/539.1; 340/539.11; 340/539.13; 340/539.23; 340/5.61; 340/5.72

(58) Field of Classification Search
None
See application file for complete search history.

(56) References Cited

U.S. PATENT DOCUMENTS

| | | | |
|---|---|---|---|
| 6,112,139 A * | 8/2000 | Schubert et al. ................... 701/2 |
| 7,554,443 B1 * | 6/2009 | Alexander et al. ........ 340/539.32 |
| 2004/0002354 A1 * | 1/2004 | Nagano ........................ 455/550.1 |
| 2004/0127198 A1 * | 7/2004 | Roskind et al. ............. 455/412.2 |
| 2007/0030165 A1 * | 2/2007 | Teshima et al. ........... 340/825.49 |
| 2008/0001708 A1 * | 1/2008 | Nakashima et al. ......... 340/5.72 |
| 2008/0157919 A1 | 7/2008 | Sugiura et al. |
| 2008/0231417 A1 * | 9/2008 | Kurpinski et al. ........... 340/5.72 |
| 2008/0258886 A1 * | 10/2008 | Summerlin .............. 340/426.35 |
| 2008/0266091 A1 * | 10/2008 | Hill .............................. 340/571 |
| 2010/0019925 A1 * | 1/2010 | Biondo et al. ........... 340/825.49 |

FOREIGN PATENT DOCUMENTS

| | | |
|---|---|---|
| JP | 2008-163633 A | 7/2008 |
| JP | 2009197508 A | 9/2009 |

OTHER PUBLICATIONS

Office Action Issued in Japanese Application No. 2009-215846, Dated: Mar. 19, 2013 (6 Pages With English Translation).

* cited by examiner

*Primary Examiner* — Benjamin C. Lee
*Assistant Examiner* — Curtis King
(74) *Attorney, Agent, or Firm* — Osha Liang LLP

(57) ABSTRACT

A vehicle control device mounted on a vehicle has a search signal transmission unit that transmits a search signal for searching a position of a portable device, which remotely operates the control device, a determination unit that determines a bright and dark state of outside of the vehicle, and a storage unit that stores a determination result of the determination unit. When searching for the portable device, a first search signal for causing the portable device to perform an informing operation of visually informing the position of the portable device is transmitted from the search signal transmission unit if the determination result in which the outside of the vehicle is determined as the dark state by the determination unit is stored in the storage unit, and a second search signal for not causing the portable device to perform the informing operation of visually informing the position of the portable device is transmitted from the search signal transmission unit if the determination result in which the outside of the vehicle is determined as the bright state by the determination unit is stored in the storage unit.

9 Claims, 12 Drawing Sheets

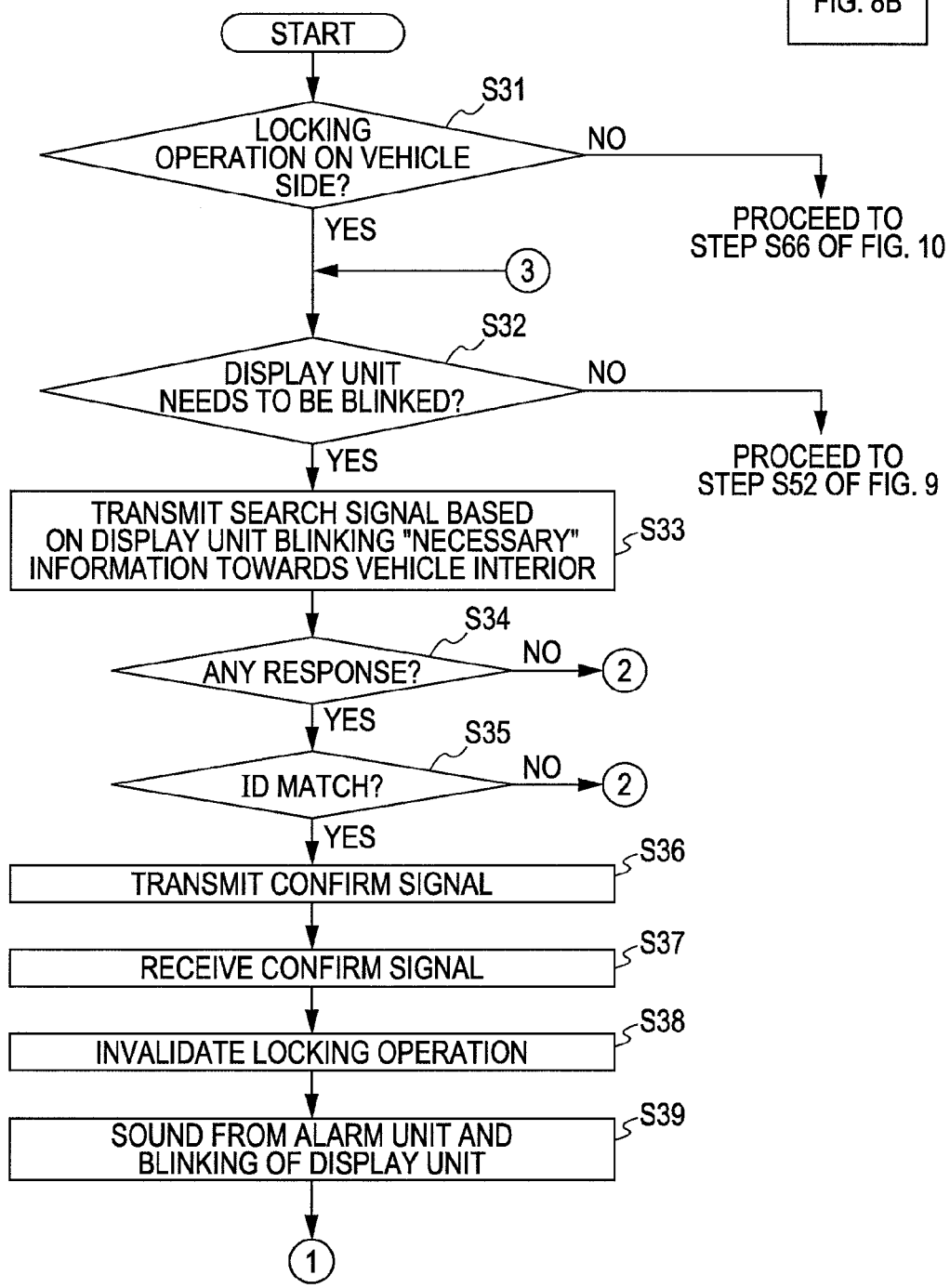

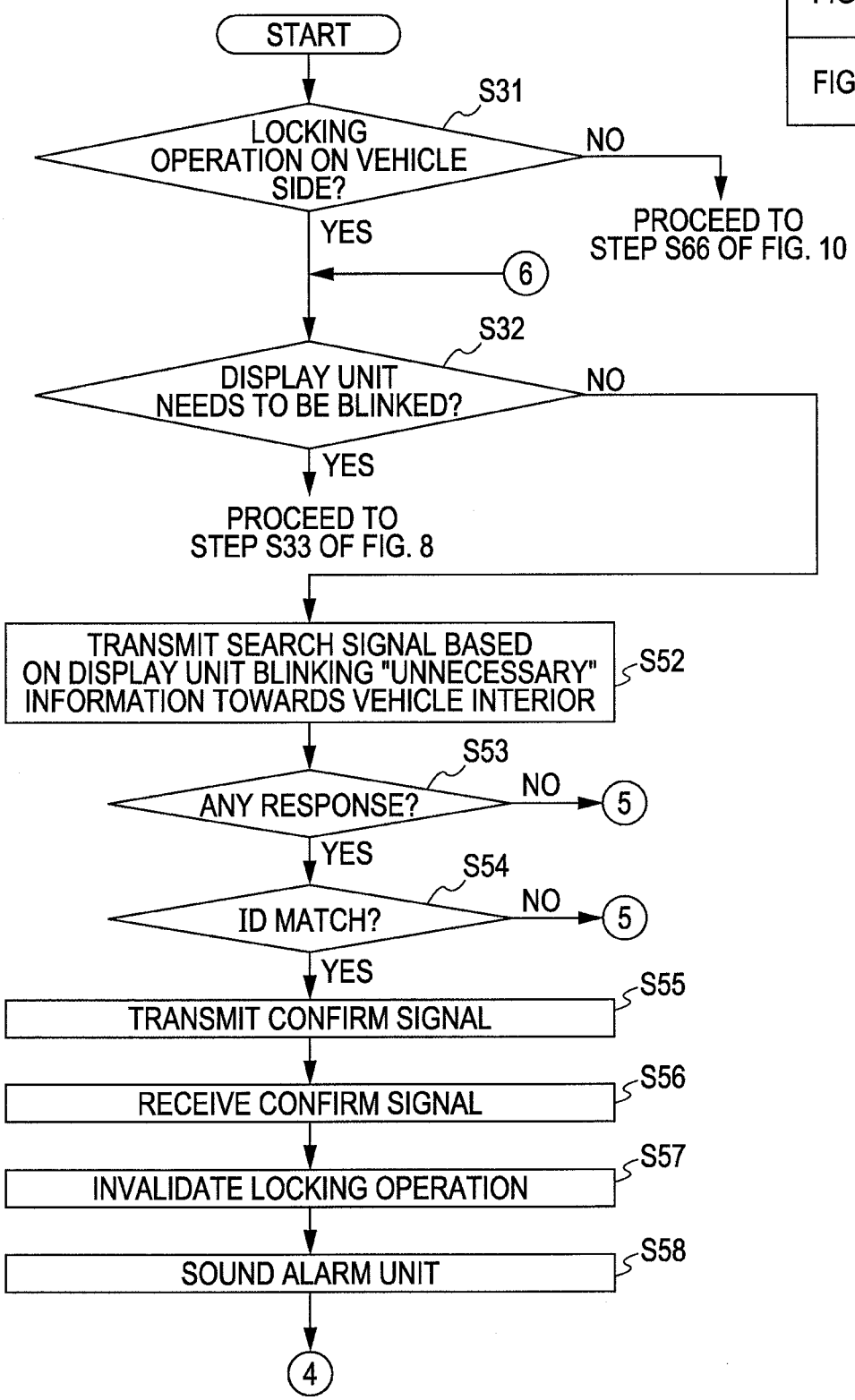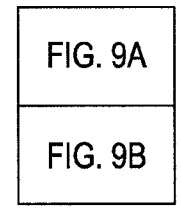
FIG. 9A
FIG. 9

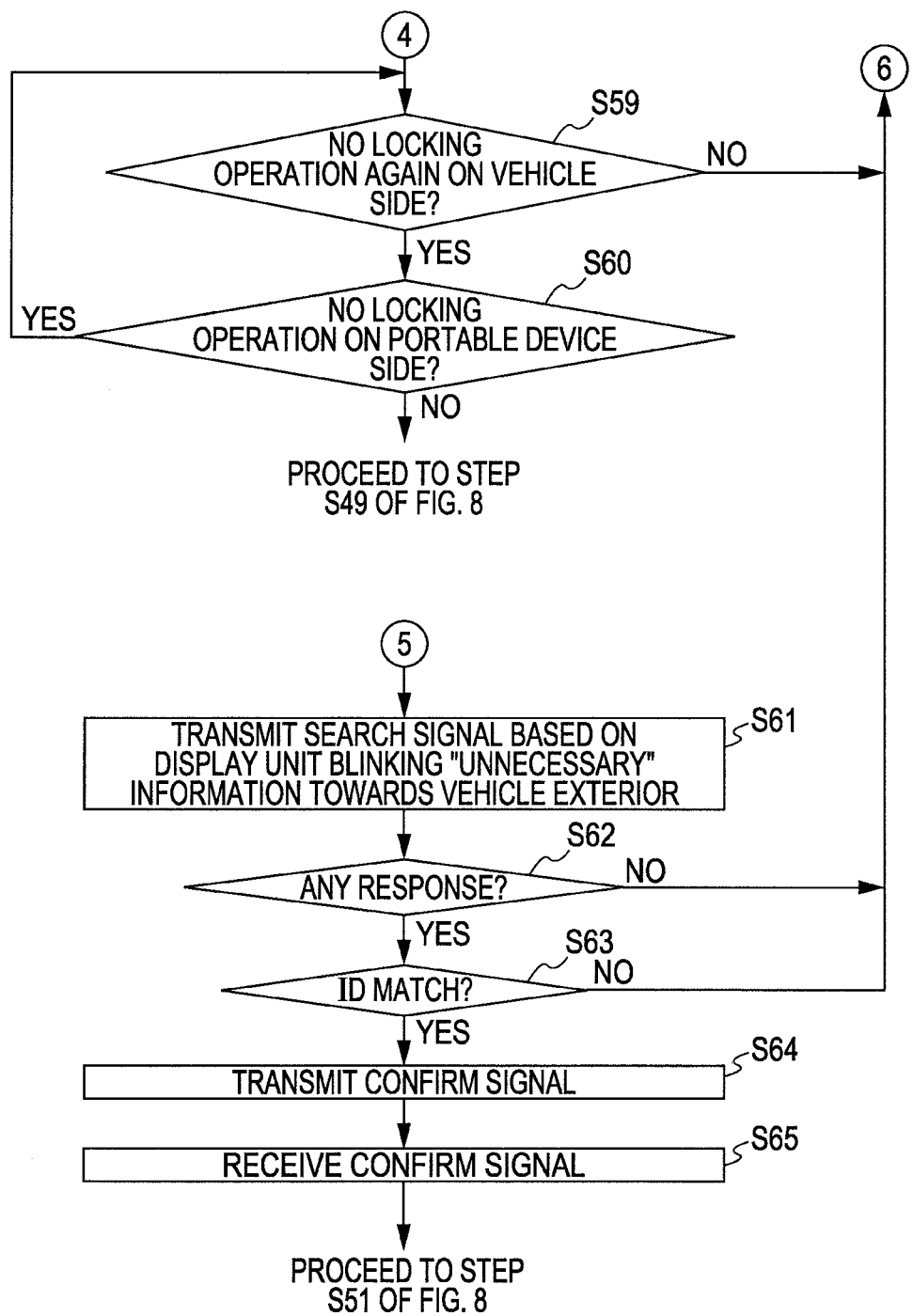

VEHICLE CONTROL DEVICE, PORTABLE DEVICE, PORTABLE DEVICE SEARCH SYSTEM

BACKGROUND OF THE INVENTION

1. Technical Field

The present invention relates to a system including a control device mounted on a vehicle, and a portable device for remotely operating the control device.

2. Related Art

Conventionally, an electronic key system of performing communication between a vehicle control device such as an ECU (Electronic Control Unit) and a BCM (Body Control Module) mounted on an automobile and a portable wireless transmitter (hereinafter described as "portable device") owned by the driver, and locking and unlocking a ride-on/off door etc. or starting or stopping the engine when the communication is established has been put to practical use.

However, in this type of electronic key system, the portable device is difficult to find when the portable device is lost. Japanese Unexamined Patent Publication No. 2008-163633 discloses an electronic key system of informing the position of the portable device to the periphery by transferring a search signal for searching the portable device from the vehicle control device to the portable device, and activating an informing unit arranged in the portable device when the portable device is lost.

When the informing unit arranged in the portable device is a light emitting unit such as an LED (Light Emitting Diode), the light emitting unit activates (blinks or lights on) based on the search signal, and thus the portable device can be easily found when looking for the lost portable device at night or in dark places.

SUMMARY

However, in the electronic key system of Japanese Unexamined Patent Publication No. 2008-163633, the light emitting unit activates (blinks or lights) even when looking for the lost portable device at daytime or in bright places, and thus the power used for the light emission becomes a waste. Thus, consumption of the power supply device (e.g., battery) built in the portable device also becomes faster.

One or more embodiments of the present invention provides a vehicle control device and a portable device capable of suppressing the consuming amount of power used when searching for the portable device, and a portable device search system equipped with the same.

In accordance with one aspect of the present invention, a vehicle control device mounted on a vehicle includes: a search signal transmission unit for transmitting a search signal for searching a position of a portable device, which remotely operates the control device; a determination unit for determining a bright and dark state of outside of the vehicle; and a storage unit for storing a determination result of the determination unit.

When searching for the portable device, a first search signal for causing the portable device to perform an informing operation of visually informing the position of the portable device is transmitted from the search signal transmission unit if the determination result in which the outside of the vehicle is determined as the dark state by the determination unit is stored in the storage unit. A second search signal for not causing the portable device to perform the informing operation of visually informing the position of the portable device is transmitted from the search signal transmission unit if the determination result in which the outside of the vehicle is determined as the bright state by the determination unit is stored in the storage unit.

Therefore, in one or more embodiments of the present invention, the informing operation of visually informing the position of the portable device is performed by the portable device only when the outside of the vehicle is a dark state, that is, when in a vehicle exterior environment where portable device is difficult to find. Thus, the wasteful informing operation does not need to be performed by the portable device when the outside of the vehicle is a bright state, that is, when in a vehicle exterior environment where portable device is easy to find. The consuming amount of power used on the portable device side thus can be suppressed when searching for the portable device. That is, the lifespan of the battery generally used as a power supply of the portable device is suppressed from being short.

In the above aspect of the present invention, the vehicle control device further includes: a locking operation unit for locking a door of the vehicle. The first or the second search signal is transmitted from the search signal transmission unit if the locking operation unit is operated when searching for the portable device.

Therefore, search signal is transmitted to search for the portable device only when the locking operation of the door of the vehicle is performed, and thus the search signal does not need to be transmitted from the vehicle control device on a constant basis. The load of the vehicle control device thus can be alleviated.

In the above aspect of the present invention, a stop signal for stopping the informing operation is transmitted from the search signal transmission unit when a time in which the informing operation is performed by the portable device exceeds a predetermined time.

Therefore, the informing operation on the portable device side can be automatically stopped after elapse of a predetermined time even if the portable device is not found by the driver and the like, and hence the power supply (battery) on the portable device side can be prevented from being worn.

In the above aspect of the present invention, the vehicle control device may further include: an illuminance measurement unit for measuring an illuminance of the outside of the vehicle.

The determination unit determines that the outside of the vehicle is the dark state when the illuminance measured by the illuminance measurement unit is smaller than a reference value set in advance, and determines that the outside of the vehicle is the bright state when the illuminance measured by the illuminance measurement unit is greater than or equal to the reference value set in advance.

Therefore, in a conventional vehicle mounted with a system for lighting the headlight when the illuminance of the vehicle exterior measured by the illuminance measurement unit becomes smaller than a reference value set in advance, one or more embodiments of the present invention can be easily implemented using the relevant system, and hence the introducing cost can be saved.

In the above aspect of the present invention, the determination unit determines that the outside of the vehicle is the dark state when a time difference between a light-off time of a headlight of the vehicle and a current time is within a predetermined time, and determines that the outside of the vehicle is the bright state when the time difference between the light-off time of the headlight of the vehicle and the current time is greater than the predetermined time.

Therefore, if the portable device is searched at a time a considerable time has elapsed from the light-off time of the headlight, for example, at eight o'clock in the morning at which 12 hours have elapsed from the light-off time of eight o'clock in the afternoon, the informing unit can be prevented from being mistakenly operated even though the periphery is bright.

In accordance with another aspect of the present invention, a portable device for remotely operating the above vehicle control device includes: a search signal reception unit for receiving the first and the second search signals; and an informing unit for performing the informing operation of visually informing the position of the portable device.

The informing unit performs the informing operation of visually informing the position of the portable device when the first search signal is received by the search signal reception unit; and the informing unit does not perform the informing operation of visually informing the position of the portable device when the second search signal is received by the search signal reception unit.

Therefore, the informing operation of visually informing the position of the portable device is performed by the portable device only when the outside of the vehicle is a dark state, that is, when in a vehicle exterior environment where portable device is difficult to find. Thus, the wasteful informing operation does not need to be performed when the outside of the vehicle is a bright state, that is, when in a vehicle exterior environment where portable device is easy to find. The consuming amount of power used on the portable device side thus can be suppressed when searching for the portable device. That is, the lifespan of the battery generally used as a power supply of the portable device is suppressed from being short.

In the above another aspect of the present invention, the portable device further includes: a remote operation unit for remotely operating the vehicle control device. If the remote operation unit is operated while the informing operation by the informing unit is being performed, a stop signal for stopping the informing operation by the informing unit is received by the search signal reception unit and the informing operation is stopped.

Therefore, the informing operation is not terminated until the portable device is found by the driver etc., and some kind of operation (e.g., locking operation) is performed at the portable device, and hence the lost portable device can be easily found.

In accordance with still another aspect of the present invention, a portable device search system includes the above vehicle control device and the above portable device.

According to one or more embodiments of the present invention, the informing operation of visually informing the position of the portable device is performed by the portable device only when the outside of the vehicle is a dark state in searching for the portable device. Thus, the wasteful informing operation does not need to be performed by the portable device when the outside of the vehicle is a bright state. The consuming amount of power used on the portable device side thus can be suppressed when searching for the portable device.

BRIEF DESCRIPTION OF THE DRAWINGS

FIG. 9 is a flowchart showing the operation when searching for the portable device.

DETAILED DESCRIPTION

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Hereinafter, embodiments of the present invention applied to the electronic key system of the vehicle will be described with reference to the drawings.

Figure 1:
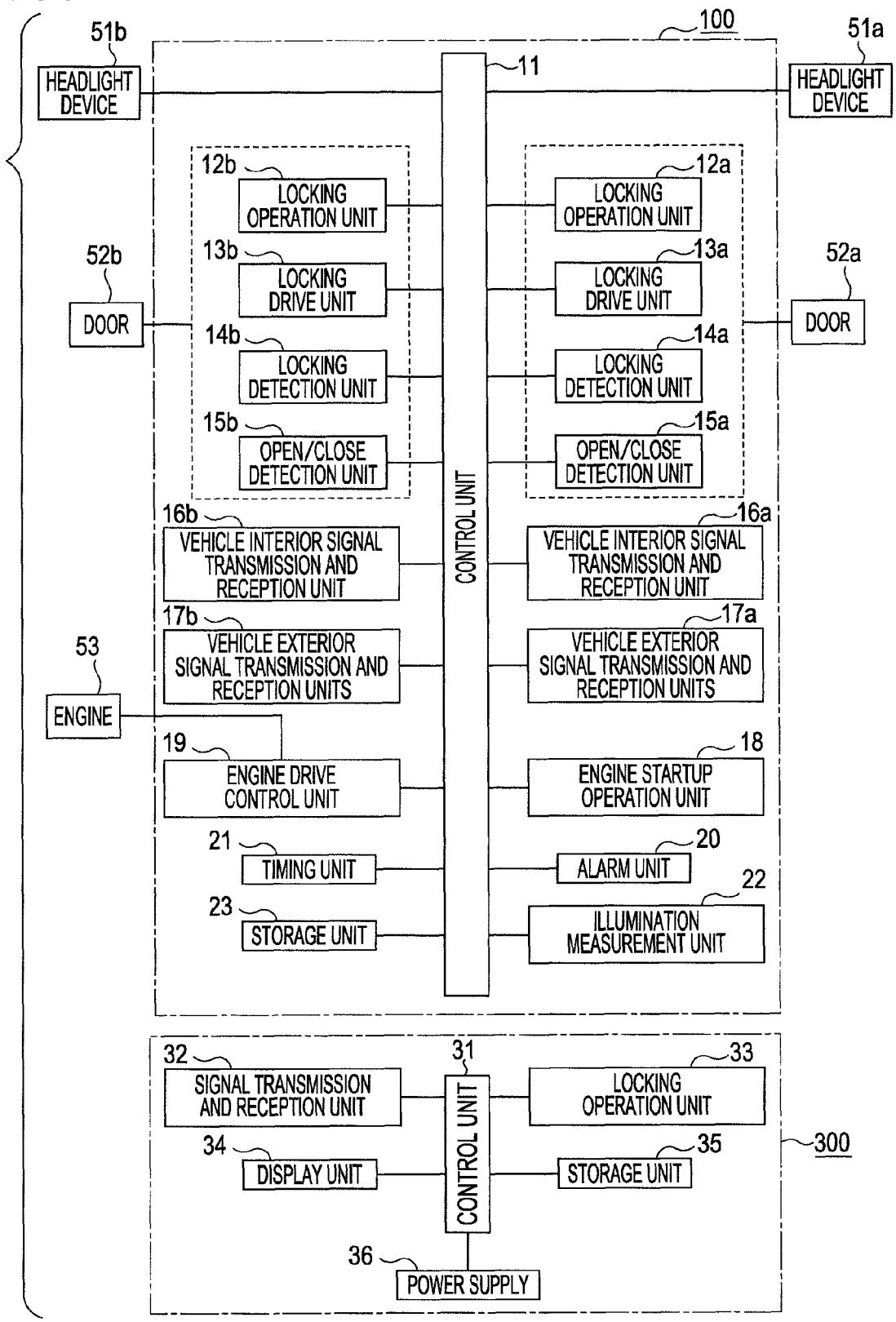
FIG. 1 is a block diagram showing one example of the electronic key system according to one or more embodiments of the present invention.

FIG. 1 is a block diagram showing one example of the configuration of the electronic key system according to one or more embodiments of the present invention. In the figure, a vehicle control device 100 controls each unit of the vehicle. The vehicle control device 100 is mounted on a vehicle 200 shown in FIG. 2.

Figure 2:
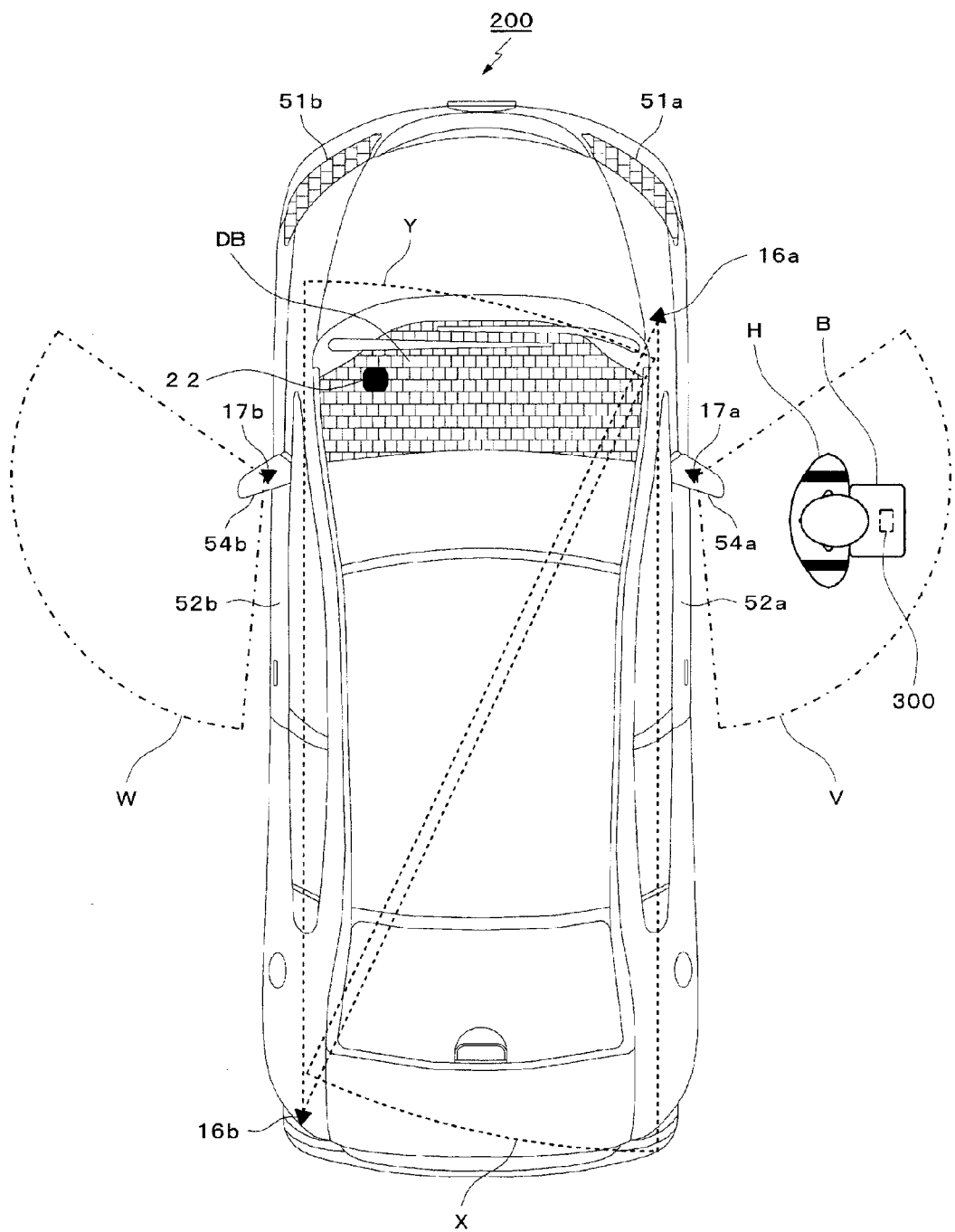
FIG. 2 is a view showing a vehicle for applying an electronic key system.

A portable wireless transmitter/receiver (hereinafter described as "portable device") 300 is used when remotely performing the operation necessary for the execution of various types of controls by the vehicle control device. The portable device 300 is carried around in a bag B (FIG. 2) carried by a driver H (FIG. 2).

The vehicle control device 100 performs a control of headlight devices 51a, 51b for enhancing the visibility of the front side of the vehicle 200, a door 52a for getting on and off to and from the driver seat (not shown), a door 52b for getting on and off to and from the passenger seat (not shown), an engine 53 for driving the vehicle 200, and the like. The operations related to locking and unlocking of the doors 52a, 52b are executed in the portable device 300. That is, the portable device 300 has a function serving as an electronic key.

As shown in FIG. 1, the vehicle control device 100 includes a control unit 11, locking operation units 12a, 12b, locking drive units 13a, 13b, locking detection units 14a, 14b, open/close detection units 15a, 15b, vehicle interior signal transmission and reception units 16a, 16b, vehicle exterior signal transmission and reception units 17a, 17b, an engine startup operation unit 18, an engine drive control unit 19, an alarm unit 20, a timing unit 21, an illuminance measurement unit 22, and a storage unit 23.

The vehicle control device 100 is also configured by various devices (e.g., battery) other than the above, the illustration and the description thereof will be omitted.

Similarly, as shown in FIG. 1, the portable device 300 includes a control unit 31, a signal transmission and reception unit 32, a locking operation unit 33, a display unit 34, a storage unit 35, and a power supply 36.

The portable device 300 is also configured by various devices (e.g., mechanical key) other than the above, the illustration and the description thereof will be omitted.

The vehicle control device 100 and the portable device 300 configure a portable device search system.

In the following, each unit of the vehicle control device 100 will be described first. The control unit 11 is configured by a CPU (Central Processing Unit), and the like, which controls each unit of the vehicle control device 100.

Figure 3:
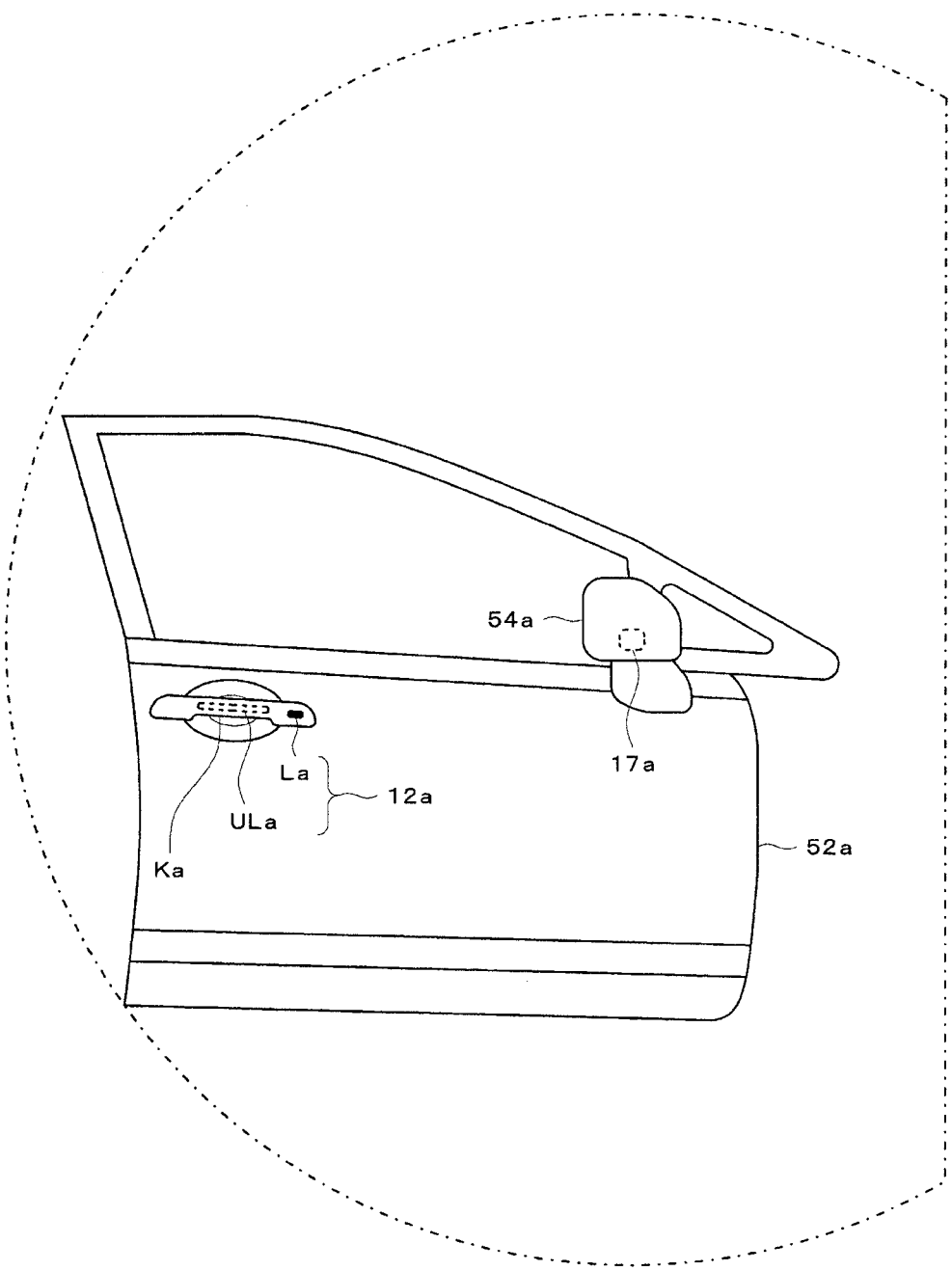
FIG. 3 is a view showing details of a door on a driver seat side.

The locking operation units 12a, 12b are configured by a push-type button etc. Specifically, the locking operation unit 12a is configured by a locking button La arranged on the front side of a knob Ka, which is on the outer side of the door 52a (FIG. 3), an unlocking sensor ULa arranged on the back side of the knob Ka, and a lock/unlock switch (not shown) arranged on the inner side of the door 52a.

The locking operation unit 12b is also configured by a locking button Lb arranged on the front side of a knob Kb, which is on the outer side of the door 52b (FIG. 4), an unlocking sensor ULb arranged on the back side of the knob Kb, and a lock/unlock switch (not shown) arranged on the inner side of the door 52b.

When the locking operation unit 12a, 12b is operated, the operation signal (locking operation signal or unlocking operation signal) corresponding to the relevant operation is input to the control unit 11.

For instance, when the locking operation is performed with the locking button La or the lock/unlock switch arranged on the inner side of the door 52a, the locking operation signal for locking the door 52a and the door 52b is input to the control unit 11.

When the unlocking operation is performed with the unlocking sensor ULa or the lock/unlock switch arranged on the inner side of the door 52a, the unlocking operation signal for unlocking the door 52a and the door 52b is input to the control unit 11.

When the locking operation is performed with the locking button Lb or the lock/unlock switch arranged on the inner side of the door 52b, the locking operation signal for locking only the door 52b is input to the control unit 11.

When the unlocking operation is performed with the unlocking sensor ULb or the lock/unlock switch arranged on the inner side of the door 52b, the unlocking operation signal for unlocking only the door 52b is input to the control unit 11.

The locking drive units 13a, 13b are configured by a lock mechanism for locking/unlocking the doors 52a, 52b, a motor for driving the lock mechanism, and the like. The locking drive units 13a, 13b lock/unlock the doors 52a, 52b according to the locking operation units 12a, 12b or the operation content of the locking operation unit 33, to be hereinafter described, under the control of the control unit 11.

The locking detection units 14a, 14b are configured by a switch, and the like. The locking detection unit 14a detects whether or not the door 52a is in the locked state, and the locking detection unit 14b detects whether or not the door 52b is in the locked state.

The open/close detection units 15a, 15b are configured by an open/close sensor, and the like. The open/close detection unit 15a detects whether or not the door 52a is in the closed state, and the open/close detection unit 15b detects whether or not the door 52b is in the closed state.

The vehicle interior signal transmission and reception units 16a, 16b are configured by an antenna, and the like. The vehicle interior signal transmission and reception unit 16a is arranged on the front right part of the vehicle 200 (see FIG. 2), and the vehicle interior signal transmission and reception unit 16b is arranged on the back left part of the vehicle 200 (see FIG. 2).

The communication range of the vehicle interior signal transmission and reception unit 16a is limited to the interior of the vehicle 200, and such communication range is within a region surrounded by a dotted line X shown in FIG. 2. The communication range of the vehicle interior signal transmission and reception unit 16b is also limited to the interior of the vehicle 200, and such communication range is within a region surrounded by a dotted line Y shown in FIG. 2.

The communication ranges of the vehicle interior signal transmission and reception units 16a, 16b extends up to the corners of the passenger compartment (not shown) to where the driver H etc. ride on, and the luggage compartment for storing luggage and the like. Thus, the vehicle interior signal transmission and reception units 16a, 16b and the portable device 300 can communicate when the portable device 300 is inside the vehicle 200.

The vehicle interior signal transmission and reception units 16a, 16b having the above configuration transmit a search signal for searching whether or not the portable device 300 is within the respective communication range under the control of the control unit 11. The vehicle interior signal transmission and reception units 16a, 16b also receive a predetermined signal transmitted from the portable device 300. The details on the signals transmitted from the portable device 300 to the vehicle interior signal transmission and reception units 16a, 16b will be described later.

Figure 4:
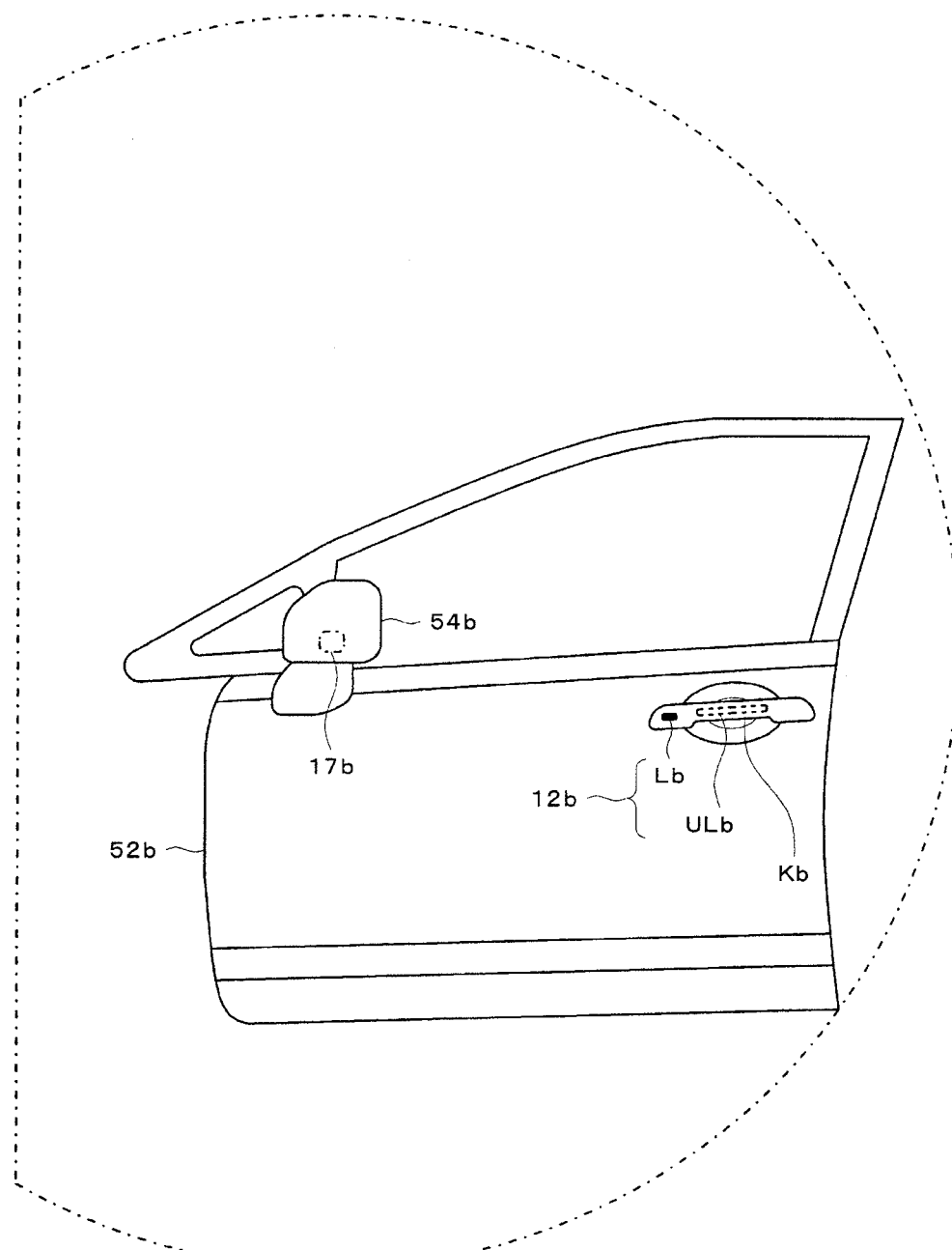
FIG. 4 is a view showing details of a door on a passenger seat side.

The vehicle exterior signal transmission and reception units 17a, 17b are configured by an antenna, and the like. The vehicle exterior signal transmission and reception unit 17a is arranged on a side mirror 54a of the vehicle 200 (FIGS. 2 and 3), and the vehicle exterior signal transmission and reception unit 17b is arranged on a side mirror 54b of the vehicle 200 (FIGS. 2 and 4).

The communication ranges of the vehicle exterior signal transmission and reception unit 17a, 17b are limited to the exterior of the vehicle 200, and such communication ranges are within regions surrounded by chain dashed line V, W shown in FIG. 2, respectively. The vehicle exterior signal transmission and reception units 17a, 17b and the portable device 300 thus can communicate when the portable device 300 is at outside the vehicle 200 and is within the region surrounded by the chain dashed line V, W.

The vehicle exterior signal transmission and reception units 17a, 17b having the above configuration transmit a search signal for searching whether or not the portable device 300 is within the respective communication range under the control of the control unit 11. The vehicle exterior signal transmission and reception units 17a, 17b also receive a predetermined signal transmitted from the portable device 300. The details on the signals transmitted from the portable device 300 to the vehicle exterior signal transmission and reception units 17a, 17b will be described later.

The engine startup operation unit 18 is configured by a push-type button and the like. When the engine startup operation unit 18 is operated, the operation signal (engine startup signal or engine stop signal) corresponding to the relevant operation is input to the control unit 11.

The engine drive control unit 19 is configured by an arithmetic circuit and the like. The engine drive control unit 19 calculates the fuel supply amount, the fuel injection timing, the ignition timing, and the like from the rotation number of the engine 53, the load exerted on the engine 53, and the like, and drive controls the engine 53 based on the calculation result.

The alarm unit 20 is configured by a buzzer, and the like. The alarm unit 20 issues a predetermined alarm sound under the control of the control unit 11 when the locking operation is performed with the portable device 300 left inside the vehicle 200, when the traveling speed of the vehicle 200 exceeds a preset speed, when the door 52a or the door 53b is forcibly opened by a criminal, and the like.

The timing unit 21 is configured by a clock for timing the current time, a timer for measuring the elapsed time, and the like.

The illuminance measurement unit 22 is configured by an illuminance sensor etc. that uses a phototransistor or a photodiode, and measures the vehicle exterior illuminance of the vehicle 200. The illuminance measurement unit 22 is installed on a dashboard DB (FIG. 2) of the vehicle 200. The illuminance of the light entering from the outside to the inside of the vehicle then can be detected.

The storage unit 23 is configured by an EEPROM (Electronically Erasable and Programmable Read Only Memory), and the like. The storage unit 23 stores in advance controls programs for controlling each unit of the vehicle control device 100, various types of application software, unique ID (Identification) information for recognizing the portable device 300, to be hereinafter described, and the like.

The storage unit 23 also stores the light-off time of the headlight devices 51a, 51b, the vehicle exterior illuminance measured by the illuminance measurement unit 22, and the like.

The locking operation units 12a, 12b serve as a locking operation unit in one or more embodiments of the present invention. The vehicle interior signal transmission and reception units 16a, 16b and the vehicle exterior signal transmission and reception units 17a, 17b serves as a search signal transmission unit in one or more embodiments of the present invention. The illuminance measurement unit 22 serves as an illuminance measurement unit in one or more embodiments of the present invention. The storage unit 23 serves as a storage unit in one or more embodiments of the present invention. The control unit 11 serves as a determination unit in one or more embodiments of the present invention.

A series of operations when the light-off time of the headlight devices 51a, 51b is stored in the storage unit 23 will now be described using the flowchart of FIG. 6.

Figure 6:
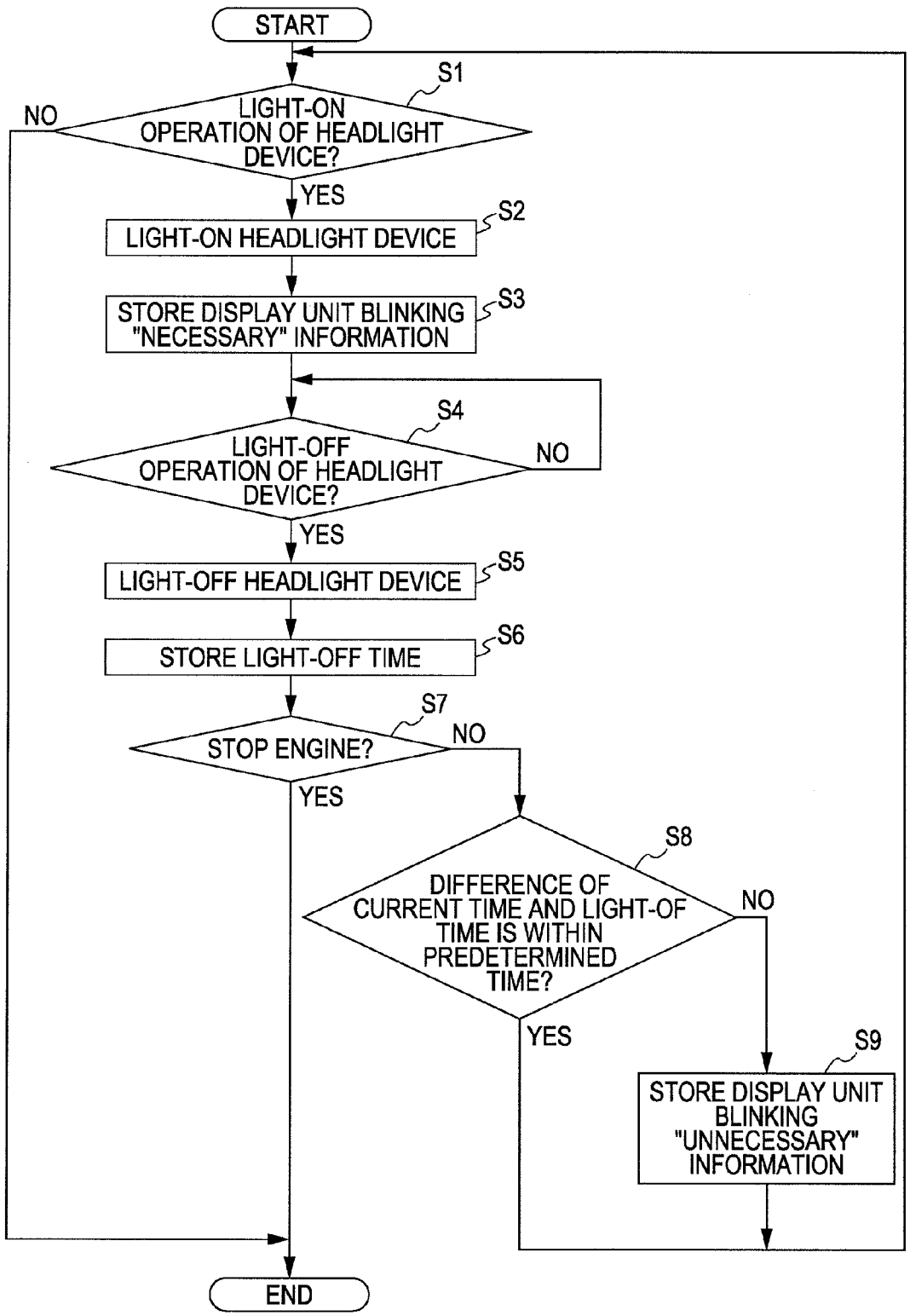
FIG. 6 is a flowchart showing the operation related to the light-on/light-off of the headlight.

The process proceeds to step S2 if the light-on operation of the headlight devices 51a, 51b is performed by the driver H (FIG. 2) in step S1 of FIG. 6 (step S1: YES), and the present flowchart is terminated if the light-on operation is not performed (step S1: NO).

A case in which step S1 becomes "YES" includes a case in which the visibility of the front side of the vehicle 200 is low to the driver H, for example, a case in which the outside of the vehicle 200 is dark. A case in which step S1 becomes "NO" includes a case in which the visibility of the front side of the vehicle 200 is high to the driver H, for example, a case in which the outside of the vehicle 200 is bright.

In step S2, the headlight devices 51a, 51b are lighted based on the execution of the light-on operation of the headlight devices 51a, 51b in step S1.

When the headlight devices 51a, 51b are lighted on in step S2, determination is made that the outside of the vehicle 200 is dark, that is, a vehicle exterior environment where the portable device 300 is difficult to find on the vehicle control device 100 side. The display unit 34 of the portable device 300 needs to be blinked when searching for the portable device 300, and hence, information for blinking the display unit 34 (hereinafter described as "blinking "necessary" information" is stored in the storage unit 23 in step S3.

The process proceeds to step S5 if the light-off operation of the headlight devices 51a, 51b is performed by the driver H in step S4, and the process returns to immediately before step S4 if the light-off operation is not performed (step S4: NO).

In step S5, the headlight devices 51a, 51b are lighted off based on the execution of the light-off operation of the headlight devices 51a, 51b in step S4.

In step S6, the light-off time of the headlight devices 51a, 51b is stored in the storage unit 23 based on the light-off of the headlight devices 51a, 51b in step S5.

The present flowchart is terminated if the stop operation of the engine 53 is performed by the driver H and the engine 53 is stopped in step S7 (step S7: YES), and the process proceeds to step S8 if the stop operation of the engine 53 is not performed, and the engine 53 is not stopped (step S7: NO).

In step S8, verification of the current time timed by the timing unit 21 and the light-off time of the headlight devices 51a, 51b stored in the storage unit 23 is carried out under the control of the control unit 11. If the difference between the current time and the light-off time is within a predetermined time (for example, one hour) set in advance (step S8: YES) as a result of the verification, the process returns to immediately before step S1. The process proceeds to step S9 if the difference is not within the predetermined time set in advance, that is, the difference exceeds the predetermined time (step S8: NO).

At the time at which a considerable time has elapsed from the light-off time of the headlight, for example, at eight o'clock in the morning at which 12 hours have elapsed from the light-off time of eight o'clock in the afternoon, the outside of the vehicle 200 is bright, that is, the vehicle exterior environment is such that the portable device 300 can be easily found. In this case, the display unit 34 of the portable device 300 does not need to be blinked when searching for the portable device 300. Thus, the information for not blinking the display unit 34 (hereinafter described as "blinking "unnecessary" information" is stored in the storage unit 23 in step S9.

In this case, the "blinking "necessary" information" stored in the storage unit 23 in step S3 is overwritten and erased by the "blinking "unnecessary" information". The process again returns to immediately before step S1 after the processing operation of step S9 is terminated.

Now, a series of operations in a case where the vehicle exterior illuminance measured by the illuminance measurement unit 22 is stored will be described using the flowchart of FIG. 7.

Figure 7:
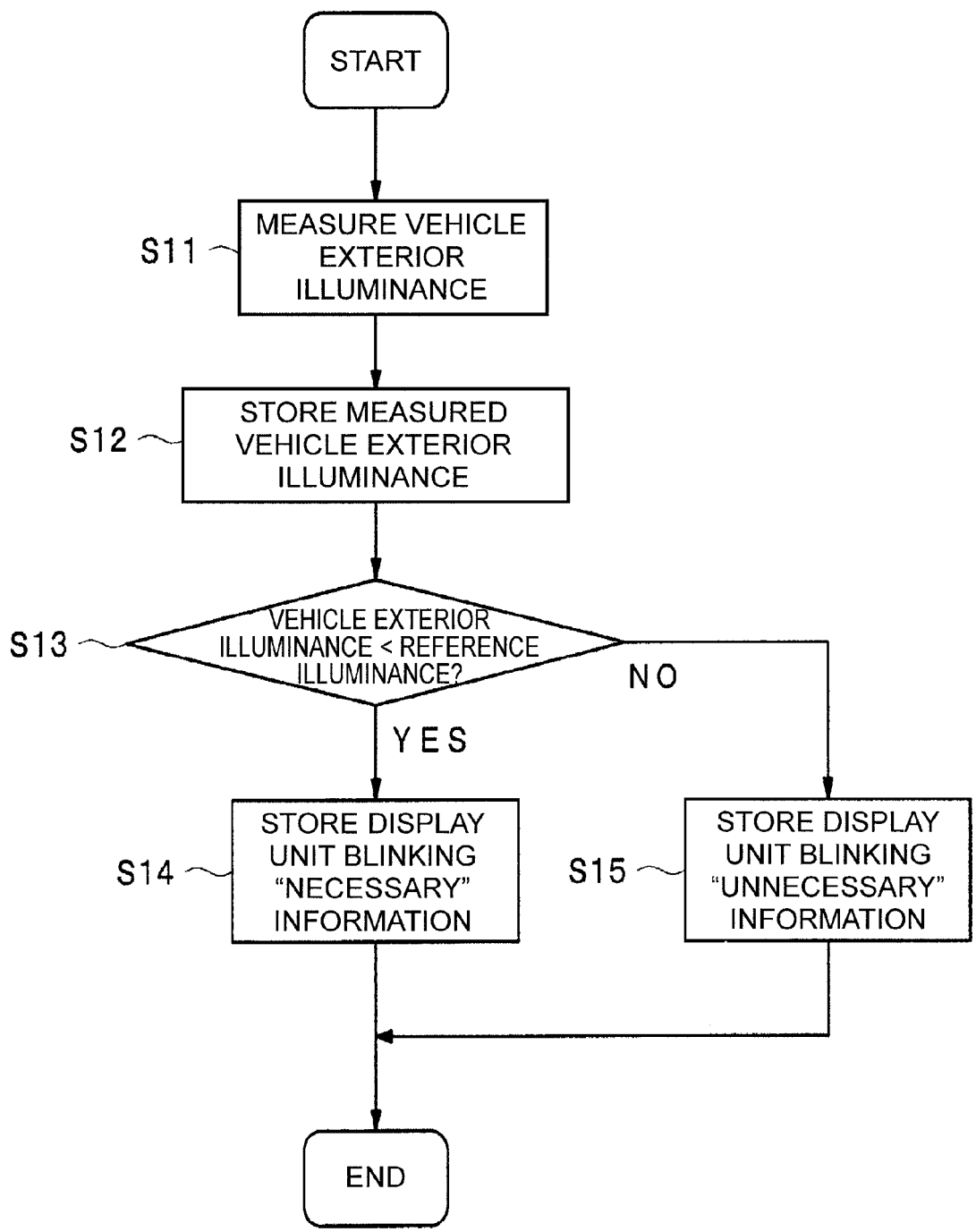
FIG. 7 is a flowchart showing the operation at the time of measuring the vehicle exterior illuminance.

In step S11 of FIG. 7, the luminance measurement unit 22 measures the vehicle exterior illuminance of the vehicle 200.

In step S12, the vehicle exterior illuminance measured in step S11 is stored in the storage unit 23.

In step S13, the vehicle exterior illuminance measured in step S11 and stored in the storage unit 23 in step S12, and the reference illuminance stored in advance in the storage unit 23 are compared and verified under the control of the control unit 11. The process proceeds to step S14 if the vehicle exterior illuminance is smaller than the reference illuminance (step S13: YES) as a result of the verification, and the process proceeds to step S15 if the vehicle exterior illuminance is greater than or equal to the reference illuminance (step S13: NO).

In step S14, determination is made by the control unit 11 that the outside of the vehicle 200 is dark based on the verification result of step S13, and thus the "blinking "necessary" information" is stored in the storage unit 23, and the present flowchart is thereafter terminated.

In step S15, determination is made by the control unit 11 that the outside of the vehicle 200 is bright based on the verification result of step S13, and thus the "blinking "unnecessary" information" is stored in the storage unit 23, and the present flowchart is thereafter terminated.

The operations between steps S11 and S15 described above are repeatedly executed every time a predetermined time (e.g., 30 minutes) has elapsed during the operation of the engine 53, for example. The "blinking "necessary" information"/"blinking "unnecessary" information" are rewritten each time.

Returning back to FIG. 1, each unit of the portable device 300 will be described. The control unit 31 is configured by a CPU, and the like, and controls each unit of the portable device 300.

The signal transmission and reception unit 32 is configured by an antenna and the like. When receiving the search signal transmitted from the vehicle control device 100 side, the signal transmission and reception unit 32 transmits the response signal with respect to the search signal towards the vehicle control device 100. The signal transmission and reception unit 32 also transmits the operation signal corresponding to the operation at the locking operation unit 33 towards the vehicle control device 100. The details on the operation signal corresponding to the operation at the locking operation unit 33 will be described later.

The response signal transmitted from the signal transmission and reception unit 32 is received by either one or both of the vehicle interior signal transmission and reception unit 16a, 16b when the portable device 300 is inside the vehicle 200 (FIG. 2). If the portable device 300 is outside the vehicle 200 and is within the communication range (chain dashed line V, W of FIG. 2) of either one of the vehicle exterior signal transmission and reception units 17a, 17b, the response signal is received by the communicable vehicle exterior signal transmission and reception unit.

Figure 5:
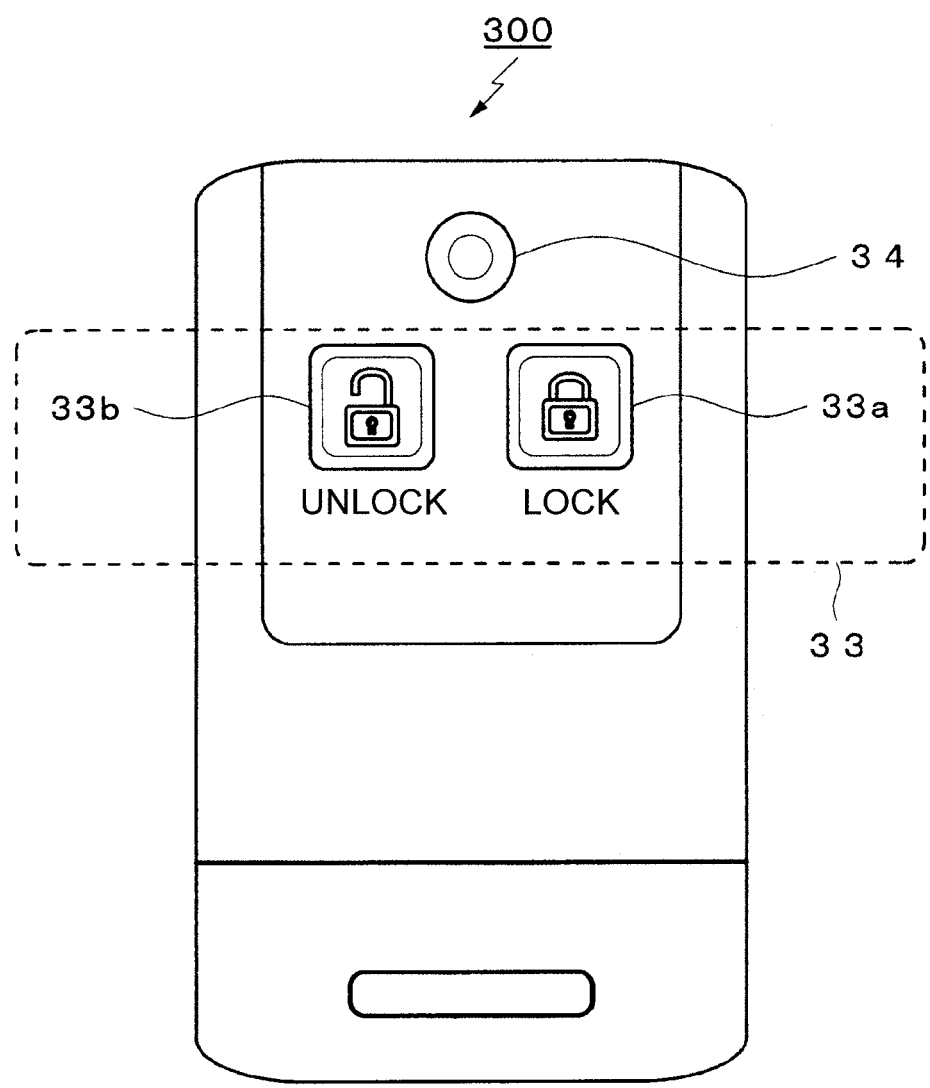
FIG. 5 is an outer appearance of a portable device used in the electronic key system.

The locking operation unit 33 is configured by a push-type button, and the like. Specifically, the locking operation unit 33 is configured by a locking button 33a and an unlocking button 33b arranged on the front side of the portable device 300 (FIG. 5).

For instance, when the locking button 33a is operated by the driver H at outside the vehicle 200, the locking operation signal for locking the door 52a and the door 52b is input to the control unit 31. The locking operation signal input to the control unit 31 is transmitted from the signal transmission and reception unit 32, and received by either one of the vehicle exterior signal transmission and reception unit 17a, 17b.

When the unlocking button 33b is operated by the driver H at outside the vehicle 200, the unlocking operation signal for unlocking the door 52a and the door 52b is input to the control unit 31. The unlocking operation signal input to the control unit 31 is transmitted from the signal transmission and reception unit 32, and received by either one of the vehicle exterior signal transmission and reception unit 17a, 17b.

The display unit 34 is configured by an LED (Light Emitting Diode). The display unit 34 blinks when a predetermined operation is executed at the locking operation unit 33, when the search of the portable device 300 is performed by the vehicle control device 100, and the like. The details on the searching operation of the portable device 300 by the vehicle control device 100 will be described later.

The storage unit 35 is configured by an EEPROM. The storage unit 35 stores ID information unique to the portable device 300 for the vehicle control device 100 to recognize the portable device 300.

The power supply 36 is a button-type battery, and supplies power to each unit of the portable device 300.

In the above description, the signal transmission and reception unit 32 serves as a search signal reception unit in one or more embodiments of the present invention. The locking operation unit 33 serves as a remote operation unit in one or more embodiments of the present invention. The display unit 34 serves as an informing unit in one or more embodiments of the present invention.

A series of operations performed when the vehicle control device 100 searches for the portable device 300 in the vehicle control device 100 (FIG. 1) and the portable device 300 (FIG. 1) having the above configuration will be described using the flowcharts of FIGS. 8 to 10.

Figure 8B:
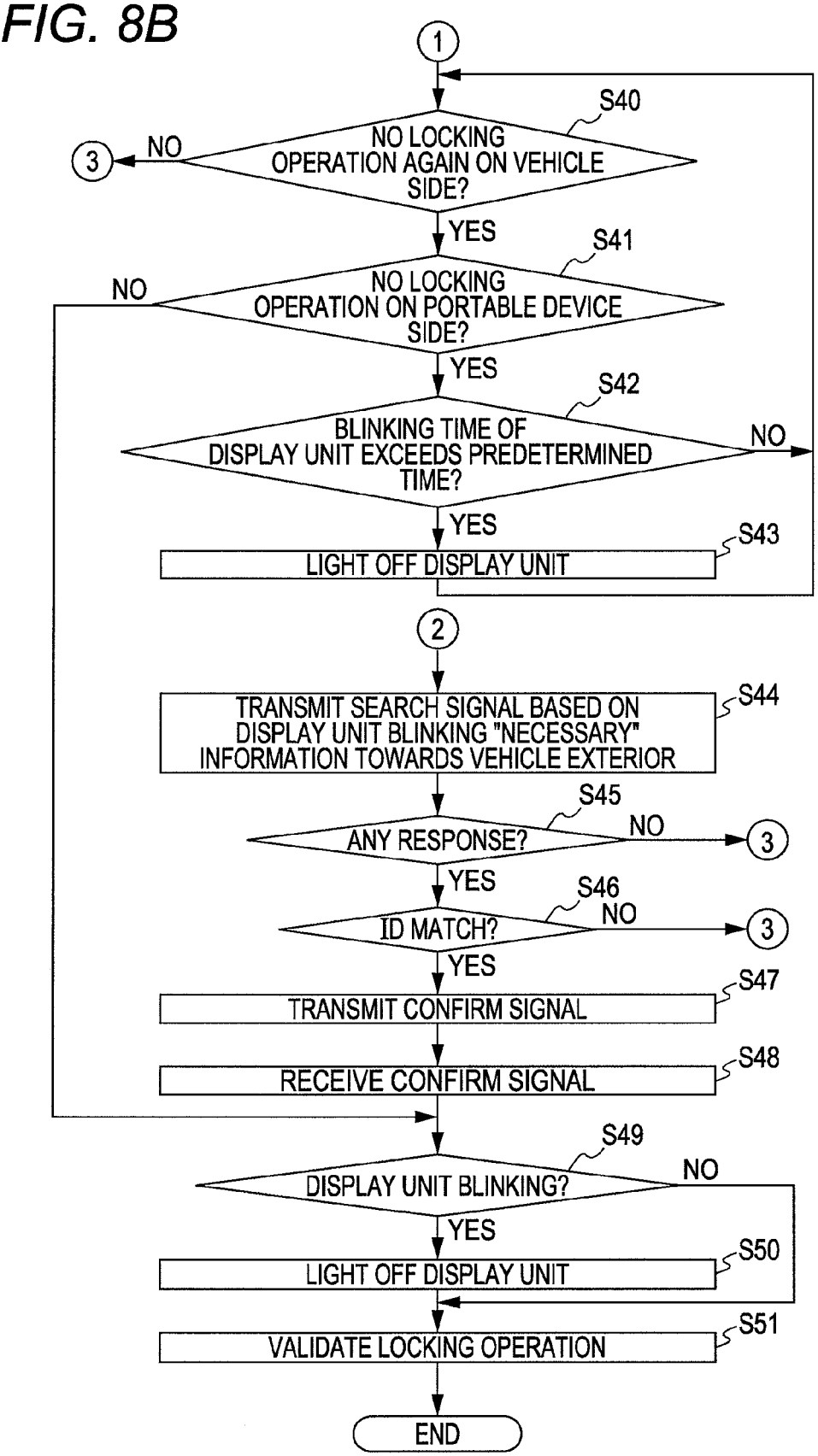
FIG. 8 is a flowchart showing the operation when searching for the portable device.

The process proceeds to step S32 if the locking operation is performed on the vehicle 200 (FIG. 2) side in step S31 of FIG. 8 (step S31: YES), and the process proceeds to step S66 of FIG. 10 if the locking operation is not performed on the vehicle 200 side (step S31: NO).

A case in which step S31 becomes "YES" is a case in which the locking button La arranged on the knob Ka of the door 52a (FIG. 3) or the locking button Lb arranged on the knob Kb of the door 52b (FIG. 4) is operated by the driver H (FIG. 2).

In step S32, whether or not the display unit 34 needs to be blinked is verified based on the "blinking "necessary" information" and the "blinking "unnecessary" information" stored in the storage unit 23 under the control of the control unit 11 (FIG. 1). The process proceeds to step S33 if the display unit 34 needs to be blinked (step S32: YES) as a result of the verification, and the process proceeds to step S52 of FIG. 9 if the display unit 34 does not need to be blinked (step S32: NO).

The verification content in step S32 will be specifically described. If the "blinking "necessary" information" based on the fact that the headlight devices 51a, 51b are lighted on (step S3 of FIG. 6) and the "blinking "necessary" information" based on the vehicle exterior illuminance (step S14 of FIG. 17) are stored in the storage unit 23, the verification result in step S32 becomes "YES".

If the "blinking "unnecessary" information" based on the fact that a time of greater than or equal to a predetermined time elapsed from the light-off time of the headlight devices 51a, 51b (step S9 of FIG. 6) and the "blinking "unnecessary" information" based on the vehicle exterior illuminance (step S15 of FIG. 7) are stored in the storage unit 23, the verification result in step S32 becomes "NO".

If the "blinking "necessary" information" based on the fact that the headlight devices 51a, 51b are lighted on (step S3 of FIG. 6) and the "blinking "unnecessary" information" based on the vehicle exterior illuminance (step S15 of FIG. 7) are stored in the storage unit 23, the update date and time of each information is verified by the control unit 11.

The verification result of step S32 becomes "YES" if the update date and time of the "blinking "necessary" information" based on the fact that the headlight devices 51a, 51b are lighted on is newer than the update date and time of the "blinking "unnecessary" information" based on the vehicle exterior illuminance as a result of the verification, and the verification result of step S32 becomes "NO" if older.

The update date and time of each information is also verified by control unit 11 if the "blinking "unnecessary" information" based on the fact that a time of greater than or equal to a predetermined time has elapsed from the light-off time of the headlight devices 51b, 51b (step S9 of FIG. 6) and the "blinking "necessary" information" based on the vehicle exterior illuminance (step S14 of FIG. 7) are stored in the storage unit 23.

The verification result of step S32 becomes "NO" if the update date and time of the "blinking "unnecessary" information" based on the fact that a time of greater than or equal to a predetermined time elapsed from the light-off time of the headlight devices 51a, 51b is newer than the update date and time of the "blinking "necessary" information" based on the vehicle exterior illuminance as a result of the verification, and the verification result of step S32 becomes "YES" if older.

In step S33, the search signal containing the "blinking "necessary" information" is transmitted from the vehicle interior signal transmission and reception units 16a, 16b (FIG. 2) towards the interior of the vehicle 200 based on the determination that blinking of the display unit 34 is necessary in step S32. The search signal containing the "blinking "necessary" information" serves as a first search signal in one or more embodiments of the present invention.

In this case, the unique ID information for recognizing the portable device 300 stored in the storage unit 23 is extracted under the control of the control unit 11. The ID information is also included in the search signal with the "blinking "necessary" information", and transmitted from the vehicle interior signal transmission and reception units 16a, 16b.

If a response from the portable device 300 is made with respect to the vehicle control device 100 in step S34 (step S34: YES), the process proceeds to step S35, and the process proceeds to step S44 if a response is not made (step S34: NO).

A case in which step S34 becomes "YES" is a case in which the portable device 300 is inside the vehicle 200 (region of dotted lines X, Y of FIG. 2), and a case in which step S34 is "NO" is a case in which the portable device 300 is outside the vehicle 200.

If "YES" in step S34, the search signal transmitted from the vehicle interior signal transmission and reception units 16a, 16b is received by the signal transmission and reception unit 32 (FIG. 2) of the portable device 300, and then the response signal with respect to the search signal is transmitted from the signal transmission and reception unit 32 towards the vehicle interior signal transmission and reception units 16a, 16b. With the reception of such response signal, the portable device 300 can be recognized as being inside the vehicle 200 on the vehicle control device 100 side.

In step S35, whether or not the ID information contained in the search signal received by the signal transmission and reception unit 32 and the ID information stored in advance in the storage unit 35 on the portable device 300 side match is verified under the control of the control unit 31 in the portable device 300. The process proceeds to step S36 if the ID information match (step S35: YES) as a result of the verification, and the process proceeds to step S44 if the ID information do not match (step S35: NO).

A case in which step S35 becomes "YES" is a case in which the portable device 300 corresponding to the vehicle control device 100 is inside the vehicle 200. A case in which step S35 becomes "NO" is a case in which the portable device not corresponding to the vehicle control device 100, that is, the portable device for a vehicle different from the vehicle 200 is inside the vehicle 200 such as when forgotten by the owner of the vehicle.

In step S36, a confirm signal for notifying the vehicle control device 100 side that the IDs match based on the verification result of step S35 is transmitted from the signal transmission and reception unit 32 of the portable device 300 to the vehicle interior signal transmission and reception units 16a, 16b of the vehicle control device 100.

In step S37, the confirm signal transmitted from the signal transmission and reception unit 32 of the portable device 300 is received by the vehicle interior signal transmission and reception units 16a, 16b of the vehicle control device 100.

The control unit 11 recognizes that the portable device 300 is inside the vehicle 200 from the series of operations from step S34 to step S37. When the door 52a, 52b is locked according to the locking operation performed in step S31 in such state, the unlocking operation using the portable device 300 cannot be performed since the portable device 300 remains left inside the vehicle 200. If the driver H (FIG. 2) and the like do not have a mechanical key, the door 52a, 52b cannot be unlocked. Thus, the control unit 11 invalidates the locking operation of step S31 in step S38 to prevent the door 52a, 52b from being locked.

In step S39, the alarm unit 20 on the vehicle control device 100 side issues a sound under the control of the control unit 11 to inform the driver H and the like, or the owner of the portable device 300, that the portable device 300 is forgotten. The display unit 34 blinks according to the "blinking "necessary" information" contained in the search signal received by the signal transmission and reception unit 32 on the portable device 300 side. The blinking operation of the display unit 34 is an example of an informing operation in one or more embodiments of the present invention.

If the locking operation is not again performed on the vehicle 200 side in step S40 (step S40: YES), the process proceeds to step S41, and if the locking operation is again performed on the vehicle 200 side (step S40: NO), the process returns to immediately before step S32. The details of the locking operation are similar to step S31, and thus the description will be omitted.

If the locking operation is not performed on the portable device 300 side in step S41 (step S41: YES), the process proceeds to step S42, and if the locking operation is performed on the portable device 300 side (step S41: NO), the process proceeds to step S49.

A case in which step S41 becomes "YES" is a case in which the portable device 300 is not found by the driver H, and the like, and the locking button 33a arranged on the portable device 300 cannot be operated. A case in which step S41 becomes "NO" is a case in which the portable device 300 is found by the driver H, and the like, and the locking button 33a arranged on the portable device 300 is operated thereafter.

In step S42, whether or not the elapsed time (blinking time) from the start of blinking of the display unit 34 exceeded a predetermined time (e.g., 10 minutes) set in advance is verified under the control of the control unit 11. Specifically, the timing of the elapsed time by the timing unit 21 is started at substantially the same time as the reception of the confirm signal in step S37, and the elapsed time is monitored by the control unit 11. The timing to start timing may be immediately after steps S33, S34, S35, S37, and S38. The process proceeds to step S43 if the blinking time exceeds a predetermined time as a result of the verification in step S42 (step S42: YES), and the process returns to immediately before step S40 if the blinking time does not exceed a predetermined time (step S42: NO).

In step S43, a light-off signal for stopping (lighting off) the blinking of the display unit 34 is transmitted from the vehicle interior signal transmission and reception units 16a, 16b on the vehicle control device 100 side towards the signal transmission and reception unit 32 on the portable device 300 side based on the verification result of step S42. The control unit 31 lights off the display unit 34 according to the light-off signal received by the signal transmission and reception unit 32. The process returns to immediately before step S40 after the display unit 34 is lighted off. The light-off signal serves as a stop signal in one or more embodiments of the present invention.

The description will now return to the description of steps S34 and S35. The process proceeds to step S44 if step S34 is "NO", that is, if the portable device 300 is outside the vehicle 200, and if step S35 is "NO", that is, if the portable device not corresponding to the vehicle control device 100 is inside the vehicle 200.

In step S44, the search signal containing the "blinking "necessary" information" is transmitted from the vehicle exterior signal transmission and reception units 17a, 17b (FIG. 2) towards the exterior of the vehicle 200 based on the verification result in step S34 or step S35.

In this case, the unique ID information for recognizing the portable device 300 stored in the storage unit 23 is extracted under the control of the control unit 11. The ID information is also included in the search signal with the "blinking "necessary" information", and transmitted from the vehicle exterior signal transmission and reception units 17a, 17b.

If a response from the portable device 300 is made with respect to the vehicle control device 100 in step S45 (step S45: YES), the process proceeds to step S46, and the process returns to immediately before step S32 if a response is not made (step S45: NO).

A case in which step S45 becomes "YES" is a case in which the portable device 300 is within the region of chain dashed lines V, W of FIG. 2, and a case in which step S45 is "NO" is a case in which the portable device 300 is not within the region of chain dashed lines V, W of FIG. 2.

If "YES" in step S45, the search signal transmitted from the vehicle exterior signal transmission and reception units 17a, 17b is received by the signal transmission and reception unit 32 of the portable device 300, and then the response signal with respect to the search signal is transmitted from the signal transmission and reception unit 32 towards the vehicle exterior signal transmission and reception units 17a, 17b. With the reception of such response signal, the portable device 300 can be recognized as being outside the vehicle 200 on the vehicle control device 100 side.

In step S46, whether or not the ID information contained in the search signal received by the signal transmission and reception unit 32 and the ID information stored in advance in the storage unit 35 on the portable device 300 side match is verified under the control of the control unit 31 in the portable device 300. The process proceeds to step S47 if the ID information match (step S46: YES) as a result of the verification, and the process returns to immediately before step S32 if the ID information do not match (step S46: NO).

A case in which step S46 becomes "YES" is a case in which the portable device 300 corresponding to the vehicle control device 100 is outside the vehicle 200, and a case in which step S46 becomes "NO" is a case in which the portable device 300 not corresponding to the vehicle control device 100 is outside the vehicle 200.

In step S47, a confirm signal for notifying the vehicle control device 100 side that the IDs match based on the verification result of step S46 is transmitted from the signal transmission and reception unit 32 of the portable device 300 to the vehicle exterior signal transmission and reception units 17a, 17b of the vehicle control device 100.

In step S48, the confirm signal transmitted from the signal transmission and reception unit 32 of the portable device 300 is received by the vehicle exterior signal transmission and reception units 17a, 17b of the vehicle control device 100.

In step S49, whether or not the display unit 34 is blinking is verified by the control unit 31. The process proceeds to step S50 if the display unit 34 is blinking (step S49: YES) as a result of the verification, and the process proceeds to step S51 if the display unit 34 is not blinking (step S49: NO).

The control unit 11 recognizes that the portable device 300 is within the region of the chain dashed lines V, W at outside the vehicle 200 from the series of operations from step S45 to step S48. The portable device 300 will not be left inside the vehicle 200 even if the door 52a, 52b is locked according to the locking operation performed in step S31 in such state, and thus the unlocking operation using the portable device 300 can be subsequently performed.

Therefore, the display unit 34 does not need to be blinked to inform the position of the portable device 300 with respect to the portable device 300 at outside the vehicle 200. If the display unit 34 is blinking, a light-off signal for stopping (lighting off) the blinking of the display unit 34 is transmitted from the vehicle exterior signal transmission and reception units 17a, 17b on the vehicle control device 100 side towards the signal transmission and reception unit 32 on the portable device 300 side. The control unit 31 lights off the display unit 34 according to the light-off signal received by the signal transmission and reception unit 32. The process proceeds to step S51 after the display unit 34 is lighted off. The light-off signal serves as a stop signal in one or more embodiments of the present invention.

The alarm unit 20 that started to issue sound in step S39 automatically stops issuing sound after issuing sound for a predetermined number of times, and hence the stopping operation as with the display unit 34 is unnecessary.

In step S51, the locking operation in step S31 is validated to execute the locking of the door 52a, 52b since the portable device 300 as recognized as being outside the vehicle 200 by the control unit 11 from the series of operations from step S45 to step S48. The present flowchart is terminated after step S51 is terminated.

Returning back to step S41 of FIG. 8, if step S41 is "NO", the portable device 300 is found by the driver H, and the like, and thus the process proceeds to step S49 to stop (lights off) the blinking of the display unit 34 executed in step S39. The details on the operation after step S49 are similar to the above, and thus the description will be omitted.

Returning back to step S32 of FIG. 8, if step S32 is "NO", that is, if the display unit 34 does not need to be blinked, the process proceeds to step S52 of FIG. 9.

In step S52, the search signal containing the "blinking "unnecessary" information" is transmitted from the vehicle interior signal transmission and reception units 16a, 16b towards the interior of the vehicle 200 based on the verification result of step S32. The search signal containing the "blinking "unnecessary" information" serves as a second search signal in one or more embodiments of the present invention.

In this case, unique ID information for recognizing the portable device 300 stored in the storage unit 23 is extracted under the control of the control unit 11. The ID information is also included in the search signal with the "blinking "unnecessary" information", and transmitted from the vehicle interior signal transmission and reception units 16a, 16b.

If a response from the portable device 300 is made with respect to the vehicle control device 100 in step S53 (step S53: YES), the process proceeds to step S54, and the process proceeds to step S61 if a response is not made (step S53: NO).

A case in which step S53 becomes "YES" is a case in which the portable device 300 is inside the vehicle 200 (region of dotted lines X, Y of FIG. 2), and a case in which step S53 is "NO" is a case in which the portable device 300 is outside the vehicle 200.

If "YES" in step S53, the search signal transmitted from the vehicle interior signal transmission and reception units 16a, 16b is received by the signal transmission and reception unit 32 of the portable device 300, and then the response signal with respect to the search signal is transmitted from the signal transmission and reception unit 32 towards the vehicle interior signal transmission and reception units 16a, 16b. With the reception of such response signal, the portable device 300 can be recognized as being inside the vehicle 200 on the vehicle control device 100 side.

In step S54, whether or not the ID information contained in the search signal received by the signal transmission and reception unit 32 and the ID information stored in advance in the storage unit 35 on the portable device 300 side match is verified under the control of the control unit 31 in the portable device 300. The process proceeds to step S55 if the ID information match (step S54: YES) as a result of the verification, and the process proceeds to step S61 if the ID information do not match (step S54: NO).

A case in which step S54 becomes "YES" is a case in which the portable device 300 corresponding to the vehicle control device 100 is inside the vehicle 200. A case in which step S54 becomes "NO" is a case in which the portable device not corresponding to the vehicle control device 100, that is, the portable device for a vehicle different from the vehicle 200 is inside the vehicle 200 such as when forgotten by the owner of the vehicle.

In step S55, a confirm signal for notifying the vehicle control device 100 side that the IDs match based on the verification result of step S54 is transmitted from the signal transmission and reception unit 32 of the portable device 300 to the vehicle interior signal transmission and reception units 16a, 16b of the vehicle control device 100.

In step S56, the confirm signal transmitted from the signal transmission and reception unit 32 of the portable device 300 is received by the vehicle interior signal transmission and reception units 16a, 16b of the vehicle control device 100.

The control unit 11 recognizes that the portable device 300 is inside the vehicle 200 from the series of operations from step S53 to step S56. When the door 52a, 52b is locked according to the locking operation performed in step S31 in such state, the unlocking operation using the portable device 300 cannot be performed since the portable device 300 remains left inside the vehicle 200. If the driver H (FIG. 2) and the like do not have a mechanical key, the door 52a, 52b cannot be unlocked. Thus, the control unit 11 invalidates the locking operation of step S31 in step S57 to prevent the door 52a, 52b from being locked.

In step S58, the alarm unit 20 on the vehicle control device 100 side issues a sound under the control of the control unit 11 to inform the driver H and the like, or the owner of the portable device 300, that the portable device 300 is forgotten. The display unit 34 does not blink according to the "blinking "unnecessary" information" contained in the search signal received by the signal transmission and reception unit 32 on the portable device 300 side.

The alarm unit 20 automatically stops issuing sound after issuing sound for a predetermined number of times as described above, and hence the operation for stopping the sound of the alarm unit 20 is not performed after step S58.

If the locking operation is not again performed on the vehicle 200 side in step S59 (step S59: YES), the process proceeds to step S60, and if the locking operation is again performed on the vehicle 200 side (step S59: NO), the process returns to immediately before step S32. The details of the locking operation are similar to step S31, and thus the description will be omitted.

If the locking operation is not performed on the portable device 300 side in step S60 (step S60: YES), the process returns to immediately before step S59, and if the locking operation is performed on the portable device 300 side (step S60: NO), the process proceeds to step S49 of FIG. 8.

The description will now return to the description of steps S53 and S54. The process proceeds to step S61 if step S53 is "NO", that is, if the portable device 300 is outside the vehicle 200, and if step S54 is "NO", that is, if the portable device not corresponding to the vehicle control device 100 is inside the vehicle 200.

In step S61, the search signal containing the "blinking "unnecessary" information" is transmitted from the vehicle exterior signal transmission and reception units 17a, 17b towards the exterior of the vehicle 200 based on the verification result in step S53 or step S54.

In this case, the unique ID information for recognizing the portable device 300 stored in the storage unit 23 is extracted under the control of the control unit 11. The ID information is also included in the search signal with the "blinking "unnecessary" information", and transmitted from the vehicle exterior signal transmission and reception units 17a, 17b.

If a response from the portable device 300 is made with respect to the vehicle control device 100 in step S62 (step S62: YES), the process proceeds to step S63, and the process returns to immediately before step S32 if a response is not made (step S62: NO).

A case in which step S62 becomes "YES" is a case in which the portable device 300 is within the region of chain dashed lines V, W of FIG. 2, and a case in which step S62 is "NO" is a case in which the portable device 300 is not within the region of chain dashed lines V, W of FIG. 2.

If "YES" in step S62, the search signal transmitted from the vehicle exterior signal transmission and reception units 17a, 17b is received by the signal transmission and reception unit 32 of the portable device 300, and then the response signal with respect to the search signal is transmitted from the signal transmission and reception unit 32 towards the vehicle exterior signal transmission and reception units 17a, 17b. With the reception of such response signal, the portable device can be recognized as being outside the vehicle 200 on the vehicle control device 100 side.

In step S63, whether or not the ID information contained in the search signal received by the signal transmission and reception unit 32 and the ID information stored in advance in the storage unit 35 on the portable device 300 side match is verified under the control of the control unit 31 in the portable device 300. The process proceeds to step S64 if the ID information match (step S63: YES), and the process returns to immediately before step S32 if the ID information do not match (step S63: NO).

A case in which step S63 becomes "YES" is a case in which the portable device 300 corresponding to the vehicle control device 100 is outside the vehicle 200, and a case in which step S63 becomes "NO" is a case in which the portable device 300 not corresponding to the vehicle control device 100 is outside the vehicle 200.

In step S64, a confirm signal for notifying the vehicle control device 100 side that the IDs match based on the verification result of step S63 is transmitted from the signal transmission and reception unit 32 of the portable device 300 to the vehicle exterior signal transmission and reception units 17a, 17b of the vehicle control device 100.

In step S65, the confirm signal transmitted from the signal transmission and reception unit 32 of the portable device 300 is received by the vehicle exterior signal transmission and reception units 17a, 17b of the vehicle control device 100. The process proceeds to step S51 of FIG. 8 after step S65 is terminated.

Figure 10:
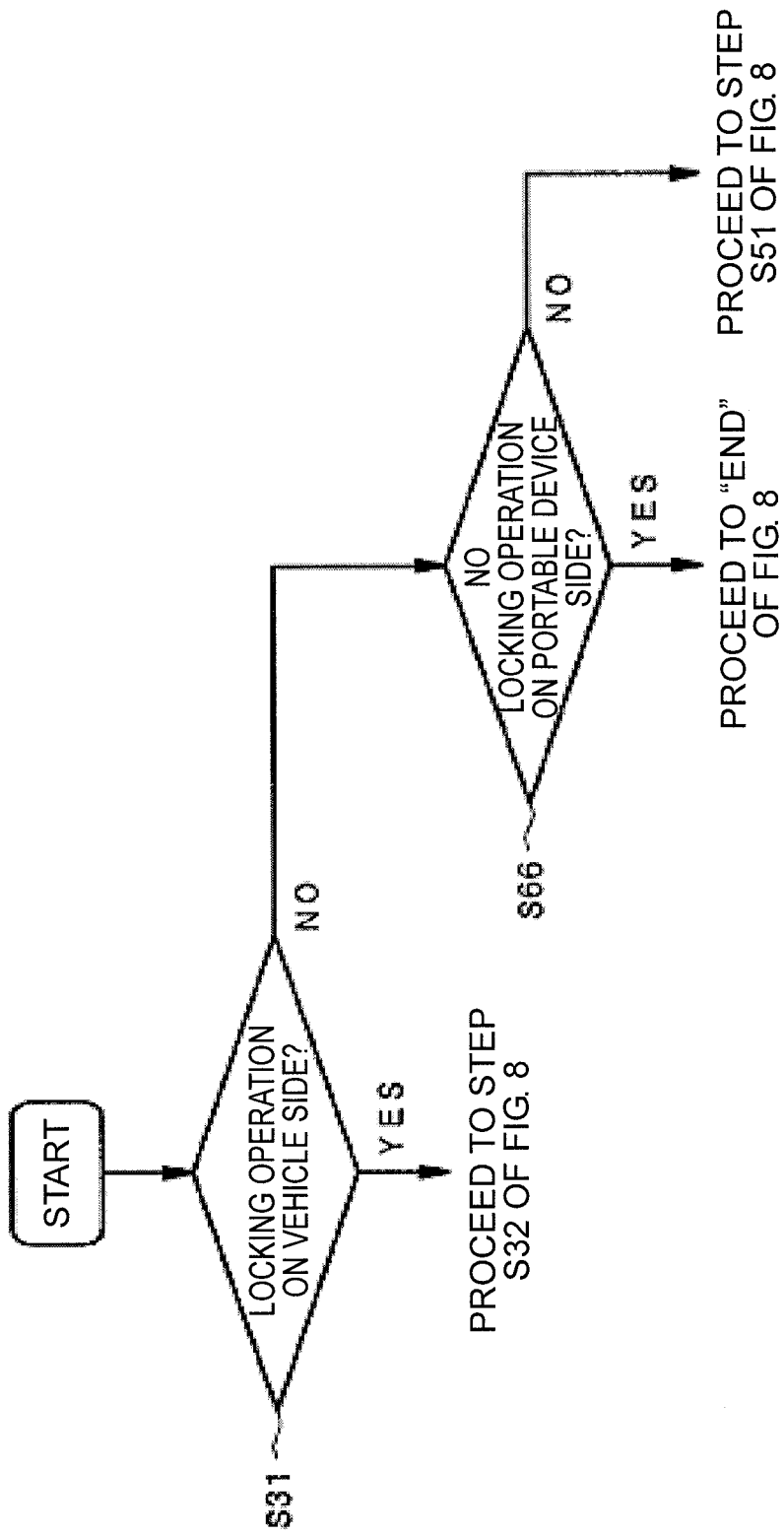
FIG. 10 is a flowchart showing the operation when searching for the portable device.

Returning back to step S31 of FIG. 8, if step S31 is "NO", that is, if the locking operation is not performed on the vehicle 200 side, the process proceeds to step S66 of FIG. 10.

The present flowchart is terminated if the locking operation is not performed on the portable device 300 side in step S66

(step S66: YES), and the process proceeds to step S51 of FIG. 8 if the locking operation is performed on the portable device 300 side (step S66: NO). The operation of step S51 has been described above, and thus the description thereof will be omitted.

As described above, according to the present embodiment, whether the outside of the vehicle 200 (FIG. 2) is a dark state or a bright state is determined from the presence of light-on of the headlight devices 51a, 51b, comparison result of the vehicle exterior illuminance measured by the illuminance measurement unit 22 and the reference value, and the like when searching for the portable device 300 (FIG. 1). If determined as the dark state, information for blinking the display unit 34 ("blinking "necessary" information") is stored in the storage unit 23 (step S3 of FIG. 6, step S14 of FIG. 7). If determined as the bright state, information for not blinking the display unit 34 ("blinking "unnecessary" information") is stored in the storage unit 23 (step S9 of FIG. 6, step S15 of FIG. 7). If the "blinking "necessary" information" is stored in the storage unit 23, the search signal containing the "blinking "necessary" information" is transmitted from the vehicle interior signal transmission and reception units 16a, 16b or the vehicle exterior signal transmission and reception units 17a, 17b of the vehicle control device 100 (steps S33, S44 of FIG. 8). If the "blinking "unnecessary" information" is stored in the storage unit 23, the search signal containing the "blinking "unnecessary" information" is transmitted from the vehicle interior signal transmission and reception units 16a, 16b or the vehicle exterior signal transmission and reception units 17a, 17b of the vehicle control device 100 (steps S52, S61 of FIG. 9).

Therefore, the blinking operation by the display unit 34 is performed to visually inform the position of the portable device 300 only when the outside of the vehicle 200 is the dark state, that is, in the vehicle exterior environment where the portable device 300 is difficult to find. Therefore, the blinking operation of the display unit 34 is not wastefully performed when the outside of the vehicle 200 is in the bright state, that is, in the vehicle exterior environment where the portable device 300 is easy to find. Thus, the lifespan of the power supply 36 (battery) can be suppressed from becoming short when searching for the portable device 300.

According to the above embodiment, when the locking operation units 12a, 12b for locking the doors 52a, 52b of the vehicle 200 are operated when searching for the portable device 300 (step S31: YES of FIGS. 8 to 10), the search signal containing the "blinking "necessary" information" or the "blinking "unnecessary" information" is transmitted from the vehicle interior signal transmission and reception units 16a, 16b, or the vehicle exterior signal transmission and reception units 17a, 17b. When the locking operation units 12a, 12b are not operated (step S31: NO of FIGS. 8 to 10), the search signal containing the "blinking "necessary" information" or the "blinking "unnecessary" information" is not transmitted from the vehicle interior signal transmission and reception units 16a, 16b, or the vehicle exterior signal transmission and reception units 17a, 17b.

Thus, the search signal is transmitted and the search of the portable device 300 is performed only when the locking operation of the doors 52a, 52b of the vehicle 200 is performed, and hence the search signal does not need to be constantly transmitted from the vehicle control device 100. The load of the vehicle control device 100 thus can be alleviated.

According to the above embodiment, if the time the display unit 34 is blinking in the portable device 300 exceeds a predetermined time (step S42: YES), the stop signal (light-off signal) for stopping the blinking operation is transmitted from the vehicle interior signal transmission and reception units 16a, 16b or the vehicle exterior signal transmission and reception units 17a, 17b.

Thus, the blinking operation of the display unit 34 can be automatically stopped after elapse of a predetermined time even when the portable device 300 is not found by the driver H, and the like, and thus the power supply 36 (battery) is prevented from dying.

According to the above embodiment, if the vehicle exterior illuminance measured by the illuminance measurement unit 22 is smaller than a reference value set in advance (step S13: YES of FIG. 7), the outside of the vehicle is determined as the dark state, and the "blinking "necessary" information" for blinking the display unit 34 is stored in the storage unit 23 (step S14 of FIG. 7). If the measured vehicle exterior illuminance is greater than or equal to a reference value set in advance (step S13: NO of FIG. 7), the outside of the vehicle is determined as the bright state, and the "blinking "unnecessary" information" for not blinking the display unit 34 is stored in the storage unit 23 (step S15 of FIG. 7).

Therefore, in the conventional vehicle mounted with a system for lighting on the headlight devices 51a, 51b when the illuminance of the outside of the vehicle 200 measured by the illuminance measurement unit 22 becomes smaller than a reference value set in advance, the above-described embodiment can be easily implemented using the relevant system, and thus the introducing cost can be reduced.

According to the above embodiment, if the time difference between the light-off time of the headlight devices 51a, 51b timed by the timing unit 21 and stored in the storage unit 23 and the current time timed by the timing unit 21 is within a predetermined time (step S8: YES of FIG. 6), the outside of the vehicle 200 is determined as the dark state and the "blinking "necessary" information" for blinking the display unit 34 stored in the storage unit 23 (step S3 of FIG. 6) remains as is without being rewritten. If the time difference between the light-off time of the headlight devices 51a, 51b timed by the timing unit 21 and stored in the storage unit 23 and the current time timed by the timing unit 21 exceeds a predetermined time (step S8: NO of FIG. 6), the outside of the vehicle 200 is determined as the bright state and the "blinking "necessary" information" stored before in the storage unit 23 is rewritten by the "blinking "unnecessary" information" for not blinking the display unit 34 (step S9 of FIG. 6).

Thus, at the time at which a considerable time has elapsed from the light-off time of the headlight devices 51a, 51b, for example, at eight o'clock in the morning at which 12 hours have elapsed from the light-off time of eight o'clock in the afternoon, the display unit 34 is prevented from mistakenly blinking although the periphery is bright when the portable device 300 is searched.

According to the above embodiment, if the locking operation is performed by the locking operation unit 33 while the display unit 34 is blinking (step S41: NO of FIG. 8), the signal transmission and reception unit 32 receives the stop signal (light-off signal) for stopping the blinking operation of the display unit 34 from the vehicle interior signal transmission and reception units 16a, 16b or the vehicle exterior signal transmission and reception units 17a, 17b that transmitted the search signal containing the "blinking "necessary" information". If the locking operation is not performed by the locking operation unit 33 while the display unit 34 is blinking (step S41: YES of FIG. 8), the signal transmission and reception unit 32 does not receive the stop signal (light-off signal) for stopping the blinking of the display unit 34 from the above signal transmission and reception units (16a, 16b, 17a, 17b).

The blinking operation of the display unit 34 does not end until the portable device 300 is found by the driver H and the like, and some kind of operation (e.g., locking operation) is performed in the portable device 300, and thus the lost portable device 300 can be easily found.

In the present invention, various embodiments other than the above can be adopted. For instance, in the above-embodiment, the stop signal for stopping the blinking operation of the display unit 34 is transmitted to the portable device 300 based on the timing operation of the timing unit 21 arranged in the vehicle control device 100, but this is not sole case, and a timing unit may be arranged in the portable device 300, and the blinking operation of the display unit 34 may be stopped based on the timing operation thereof.

In the above embodiment, the display unit 34 is an LED, but is not limited thereto, and may be configured by an LCD (Liquid Crystal Display) and a back light of the LCD.

In the above embodiment, the display unit 34 is blinked to inform the position of the portable device 300, but is not limited thereto, and the display unit 34 may be remained lighted.

Furthermore, in the above embodiment, the determination on the bright and dark state of the outside of the vehicle 200 is made based on the elapsed time from the light-off time of the headlights 51*a*, 51, and the measurement result by the illuminance measurement unit 22, but is not limited thereto, and the time zone (e.g., "early morning, morning, daytime, afternoon, late night") may be determined from the current time timed by the timing unit 21 and then the determination on the bright and dark state of the outside of the vehicle 200 may be made.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle control device mounted on a vehicle comprising:
    a search signal transmission unit for transmitting a first or second search signal for searching a position of a portable device for determining control operation of the control device, wherein the portable device remotely operates the control device;
    an illuminance measurement unit mounted on the vehicle for measuring an illuminance of an outside of the vehicle and turning on headlight devices of the vehicle;
    a determination unit for determining a bright and dark state of outside of the vehicle based on a measurement result of the illuminance measurement unit; and
    a storage unit for storing a determination result of the determination unit;
wherein, when searching for the portable device,
    a first search signal, which causes a display unit of the portable device to emit light, is transmitted from the search signal transmission unit to the portable device if the determination result in which the outside of the vehicle is determined as the dark state by the determination unit is stored in the storage unit; and
    a second search signal, which does not cause the display unit of the portable device to emit light, is transmitted from the search signal transmission unit to the portable device if the determination result in which the outside of the vehicle is determined as the bright state by the determination unit is stored in the storage unit.

2. The vehicle control device according to claim 1, further comprising:
    a locking operation unit provided on a door of the vehicle for locking the door of the vehicle;
    wherein the first or the second search signal is transmitted from the search signal transmission unit to the portable device when the locking operation unit is operated;
    wherein, if the portable device is determined to be inside the vehicle, the locking unit does not lock the door; and
    wherein, if the portable device is determined to be outside the vehicle, the locking unit locks the door.

3. The vehicle control device according to claim 1,
    wherein the determination unit determines that the outside of the vehicle is the dark state when the illuminance measured by the illuminance measurement unit is smaller than a reference value set in advance, and
    wherein the determination unit determines that the outside of the vehicle is the bright state when the illuminance measured by the illuminance measurement unit is greater than or equal to the reference value set in advance.

4. A portable device for remotely operating the vehicle control device according to claim 1, the portable device comprising:
    a search signal reception unit for receiving the first and the second search signals; and
    the display unit, wherein
        the display unit emits light when the first search signal is received by the search signal reception unit; and
        the display unit does not emit light when the second search signal is received by the search signal reception unit.

5. The portable device according to claim 4, further comprising:
    a remote operation unit for remotely operating the vehicle control device;
    wherein if the remote operation unit is operated while the informing operation by the informing unit is being performed, a stop signal for stopping the informing operation by the informing unit is received by the search signal reception unit and the informing operation is stopped.

6. A portable device search system comprising:
    the vehicle control device according to claim 1, and
    the portable device for remotely operating the vehicle control device, comprising:
    a search signal reception unit for receiving the first and the second search signals; and
    the display unit; wherein
    the display unit emits light when the first search signal is received by the search signal reception unit; and
    the display unit does not emit light when the second search signal is received by the search signal reception unit.

7. A portable device search system comprising:
    the vehicle control device according to claim 2, and a portable device for remotely operating the vehicle control device, comprising:
    the search signal reception unit for receiving the first and the second search signals; and
    the display unit; wherein
    the display unit emits light when the first search signal is received by the search signal reception unit; and
    the display unit does not emit light when the second search signal is received by the search signal reception unit.

8. A portable device search system according to claim 6, further comprising:

a remote operation unit for remotely operating the vehicle control device;

wherein if the remote operation unit is operated while the informing operation by the informing unit is being performed, a stop signal for stopping the informing operation by the informing unit is received by the search signal reception unit and the informing operation is stopped.

9. A portable device search system according to claim 7, further comprising:

a remote operation unit for remotely operating the vehicle control device;

wherein if the remote operation unit is operated while the informing operation by the informing unit is being performed, a stop signal for stopping the informing operation by the informing unit is received by the search signal reception unit and the informing operation is stopped.

* * * * *

UNITED STATES PATENT AND TRADEMARK OFFICE
CERTIFICATE OF CORRECTION

| | | |
|---|---|---|
| PATENT NO. | : 8,773,248 B2 | Page 1 of 1 |
| APPLICATION NO. | : 12/705128 | |
| DATED | : July 8, 2014 | |
| INVENTOR(S) | : Hideo Ebizawa et al. | |

It is certified that error appears in the above-identified patent and that said Letters Patent is hereby corrected as shown below:

In the Claims:

Column 19, claim 1, line 56, "...a first search signal,..." should read --...the first search signal,...--

Column 19, claim 1, line 62, "...a second search signal,..." should read --...the second search signal,...--

Column 20, claim 7, line 56, "...according to claim 2, and a portable device..." should read --...according to claim 2, and the portable device...--

Signed and Sealed this
Thirtieth Day of December, 2014

Michelle K. Lee
*Deputy Director of the United States Patent and Trademark Office*